(12) United States Patent
Beattie et al.

(10) Patent No.: US 9,733,114 B2
(45) Date of Patent: Aug. 15, 2017

(54) VOLUMETRIC MEASUREMENT VESSEL WITH SLOPED SADDLE-SHAPED BOTTOM WALL FOR OUTLET VORTEX PREVENTION

(71) Applicant: Milltown Metal Shop Ltd., Elie (CA)

(72) Inventors: Dennis Archibald Beattie, St. Andrews (CA); Darrell Daniel Waldner, Elie (CA)

(73) Assignee: MILLTOWN METAL SHOP LTD., Elie, Manitoba (CA)

( * ) Notice: Subject to any disclaimer, the term of this patent is extended or adjusted under 35 U.S.C. 154(b) by 289 days.

(21) Appl. No.: 14/679,608

(22) Filed: Apr. 6, 2015

(65) Prior Publication Data

US 2016/0252383 A1     Sep. 1, 2016

(51) Int. Cl.
    *G01F 22/00* (2006.01)
    *G01F 25/00* (2006.01)

(52) U.S. Cl.
    CPC .......... *G01F 22/00* (2013.01); *G01F 25/0038* (2013.01); *G01F 25/0084* (2013.01)

(58) Field of Classification Search
    CPC ... G01F 22/00; G01F 25/0038; G01F 25/0084
    USPC ...... 73/148–149, 1.31, 426–427, 290 R, 323
    See application file for complete search history.

(56) References Cited

U.S. PATENT DOCUMENTS

| | | | | |
|---|---|---|---|---|
| 1,473,475 A | * | 11/1923 | Eklund | F16N 7/30 222/373 |
| 1,515,746 A | * | 11/1924 | Norman | G01F 25/0038 73/1.31 |
| 1,618,621 A | * | 2/1927 | Woodruff | B67D 7/163 144/2.1 |
| 1,706,336 A | * | 3/1929 | Whitney | G01F 19/00 73/323 |
| 1,772,297 A | * | 8/1930 | Venable | B28C 7/122 222/21 |
| 2,031,230 A | * | 2/1936 | Seraphin | G01F 25/0038 73/323 |
| 2,323,128 A | * | 6/1943 | Hare | G01F 23/288 137/392 |
| 2,742,789 A | * | 4/1956 | Seraphin | G01F 25/0038 248/129 |
| 2,778,218 A | * | 1/1957 | Sault | G01F 25/0038 73/1.31 |

(Continued)

*Primary Examiner* — Daniel S Larkin
*Assistant Examiner* — Anthony W Megna Fuentes
(74) *Attorney, Agent, or Firm* — Kyle R. Satterthwaite; Ryan W. Dupuis; Ade & Company Inc.

(57) ABSTRACT

A volumetric measurement vessel is characterized by a bottom wall having an inverted saddle shape defining a concave trough at its topside, and mounted in a tilted orientation placing the trough at an obliquely inclined angle. An outlet of the vessel is positioned at a lower end of the trough at an angle matching the tilted bottom wall to provide smooth, vortex free draining of the tank body at the outer periphery thereof. The bottom wall is cut as a flat piece of squashed oval shape, and subsequently bent into curved form to create the trough. A circumferential wall of the vessel is cut as a flat piece with a wave-shaped bottom edge, then bent into circular form to align major and minor troughs of the wave shape with opposite ends of the bottom wall's concave trough.

7 Claims, 6 Drawing Sheets

(56) References Cited

U.S. PATENT DOCUMENTS

| | | | | |
|---|---|---|---|---|
| 2,831,345 | A * | 4/1958 | Wolf | F02B 61/045 |
| | | | | 73/118.04 |
| 3,040,558 | A * | 6/1962 | Whiteside | G01F 25/0038 |
| | | | | 134/177 |
| 4,563,896 | A * | 1/1986 | Arnold | G01F 23/0023 |
| | | | | 73/290 R |
| 5,705,747 | A * | 1/1998 | Bailey | G01F 23/0069 |
| | | | | 340/525 |
| 7,265,677 | B2 * | 9/2007 | Dupont | G01F 23/0007 |
| | | | | 340/612 |
| 2002/0059828 | A1 * | 5/2002 | Muller | G01F 23/284 |
| | | | | 73/290 R |

* cited by examiner

VOLUMETRIC MEASUREMENT VESSEL WITH SLOPED SADDLE-SHAPED BOTTOM WALL FOR OUTLET VORTEX PREVENTION

CROSS REFERENCE TO RELATED APPLICATIONS

This applications claims benefit under 35 U.S.C. 119(a) of Canadian Patent Application No. 2,883,460, filed Feb. 27, 2015.

FIELD OF THE INVENTION

The present relates generally to volumetric measurement vessels, and more particularly to such a vessel featuring a gauge-equipped neck standing upright from a tank body whose bottom wall is concavely curved and obliquely sloped to create an inclined trough for gravitationally directing fluid through an outlet of the tank at the lower end of the trough.

BACKGROUND

Liquid meters used in the trade of goods are often calibrated and tested for accuracy using vessels of known volume, commonly known as open neck provers. Open neck provers are made of metal and are typically comprised of a narrow upper neck that features a sight glass and scale plate and is attached to a tank body made up of a downwardly expanding top cone, a cylindrical body, a downwardly contracting lower cone complete with a drain assembly and valve. The drain may be placed concentrically at the lowest point of the bottom cone, or the cone may be eccentric in nature and the drain located other than at the center of the tank, which is known within the field as a French Drain.

Examples of such conventional open neck provers are shown in U.S. Pat. No. 2,742,789 and U.S. Pat. No. 3,040,558, where the tank body has a conical bottom wall with a central drain. One drawback of such conventional designs is the creation of vortices during draining of the tank, which is believed to contribute to the significant drain time required to empty such a tank. While a French Drain is known to reduce the drain time for a given tank size, applicant has developed a new open neck prover design that offers another alternative to the conventional center drain and offset French Drain.

SUMMARY OF THE INVENTION

According to one aspect of the invention there is provided a volumetric measurement vessel comprising:

a tank body having comprising a set of tank walls delimiting an interior space of the tank body, said set of tank walls including a top wall, an opposing bottom wall and a circumferential wall spanning between the top and bottom walls and extending about an upright axis passing through said top and bottom walls;

a neck standing upwardly from the tank body above the upper wall thereof along the upright axis, with an interior space of the neck in fluid communication with the interior space of the tank body;

a gauge associated with the neck to indicate a volumetric measure of liquid content contained within the vessel; and an outlet positioned proximate an intersection of the bottom and circumferential walls of the tank body for draining of said liquid content from the vessel;

wherein a topside of the bottom wall facing into the interior space of said tank body has a concave curvature defining a trough, the bottom wall is mounted in a tilted orientation placing the trough at an obliquely inclined angle relative to the upright axis, and the outlet is positioned at a lower end of the trough.

Preferably the outlet comprises a drain conduit projecting from the tank body at the same oblique angle as the trough of the bottom wall.

Preferably there is provided a drain valve operably installed on the drain conduit to control draining of the liquid content from the vessel through said drain conduit.

Preferably the bottom wall is defined by a curved plate of inverted saddle shape having a convexly curved underside.

Preferably the bottom wall and the circumferential wall are joined together along a path defined by the intersection of the circumferential wall with an imaginary cylinder that is greater in diameter than said circumferential wall and has a longitudinal axis perpendicular to, and offset from, the upright axis of the tank body.

According to a second aspect of the invention, there is provided a fabrication method for use in manufacturing the volumetric vessel of any one of claims 1 to 5, the method comprising producing the bottom wall by:

cutting a flat metal piece into a squashed oval shape having major and minor axes lying perpendicularly across one another and intersecting a perimeter of the piece at areas of greatest width of the piece in directions of said axes; and bending the metal piece into a curved shape about an axis parallel to the minor axis of said flat metal piece to form the trough of the bottom wall of the tank body.

According to a third aspect of the invention, there is provided a fabrication method for use in manufacturing the volumetric vessel of any one of claims 1 to 5, the method comprising producing the circumferential wall by:

cutting a flat metal piece into an elongated shape having an upper edge, an opposing lower edge, and end edges that are spaced apart in an elongated dimension of the piece and that intersect the upper and lower edges at ends thereof to complete a perimeter of the flat-metal piece, the lower edge having a wave-like shape having a major trough, a pair of crests and a minor trough; and forming the flat metal piece into a closed circular form around an axis in order to place the wave-like shape of the lower edge on the imaginary peripheral surface of an imaginary cylinder of equal or greater to said circular form; and fixing the metal piece in said circular form, whereupon said metal piece defines the circumferential wall of the tank body and the axis around which the metal piece closes defines the upright axis of the tank body, the major trough of the wave-like shape of the lower edge is alignable with the lower end of the trough of the bottom wall, and the minor trough of the wave-like shape of the lower edge resides diametrically opposite to the major trough across the upright axis.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
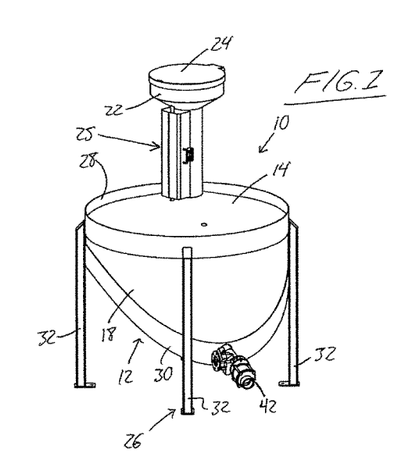
FIG. 1 is an isometric view of a volumetric proving vessel according to the present invention, a tank body of which features a sloped bottom wall with a concave topside for guiding liquid content toward an outlet at the lower end of the sloped bottom wall.
Figure 2:
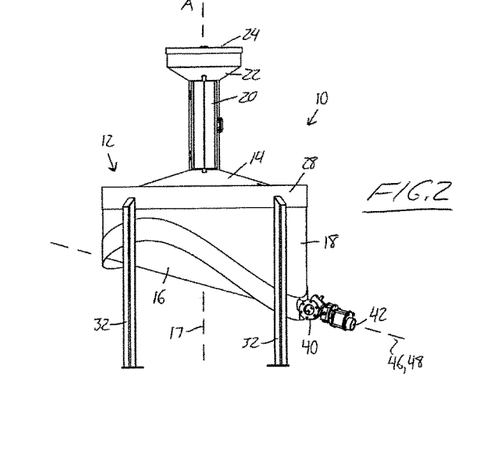
FIG. 2 is a side elevational view of the proving vessel of FIG. 1.
Figure 3:
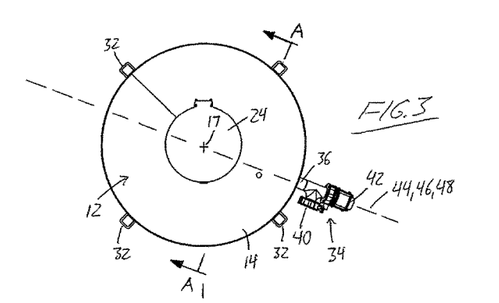
FIG. 3 is an overhead plan view of the proving vessel of FIG. 1.

FIGS. 1 to 3 illustrated a volumetric proving vessel 10 in accordance with one embodiment the present invention. The vessel 10 features a tank body 12 having a top wall 14 and an opposing bottom wall 16, which are spaced apart from one another along a vertical central axis 17 of the vessel 10. A circumferential wall 18 joins the top and bottom and bottom walls together and spans concentrically around the central axis 17 on a circular path. The top wall 14 of the illustrated embodiment has a frustoconical shape, the larger diameter end of which is affixed attached to the circumferential wall 18 at or near the top end thereof, for example by a welded seam. The smaller diameter end of the frustoconical top wall 14 supports an upright neck 20 of the vessel that stands upwardly from the top wall 14 of the tank body. The upright neck 20 is of cylindrical shape, and shares the same central axis 17 as the tank body so as to reside in concentric relation thereto. In the illustrated embodiment, a top funnel 22 is affixed, for example by welding, to the top end of the cylindrical neck 20, and has a pivotal lid 24 hinged thereatop for movement between open and closed positions revealing and obstructing access to an open top end of the funnel 22.

A hollow interior of the neck 20 is in fluid communication with an interior space of the tank body 12 via a central hole in the top wall 14 at the neck's mounted position thereatop. In a conventional manner, the vessel features a gauge 25 in the form of a sight glass and associated scale mounted to the exterior of the neck in a position standing upright alongside same. When the vessel is filled to a liquid content level that fully occupies the interior space of the tank body and reaches up into the neck 20, a user can visually read the volume measurement of the vessel's liquid content using the sight glass and the graduation markings on the associate scale plate. The vessel 10 may be filled through a drop tube in the neck when the lid 24 of the top funnel 22 is opened. The vessel may be additionally or alternatively equipped with a bottom fill inlet that may alternatively be used to fill the vessel with the fluid to be measured.

As shown, a support frame 26 of the vessel 10 may feature an upper reinforcement band 28 affixed to the outer surface of the circumferential wall 18 and spanning circumferentially around the top end of the circumferential wall 18 at the intersection thereof with the top wall 14. Similarly, a lower reinforcement band 30 may be affixed to the outer surface of the circumferential wall 18 to span circumferentially around the bottom end of the circumferential wall 18 at the intersection thereof with the bottom wall 16. A plurality of support legs 32 stand vertically upright at positions spaced angularly around the tank body at equal intervals around the central axis 17 thereof. The inner side of each leg 32 that faces toward the tank body 12 is affixed, for example by welding, to the outer face of at least one, and preferably both, of the reinforcement bands 28, 30. The height of each leg 32 exceeds the axial height of the tank body such that the legs carry the tank body in an elevated position off the ground. The support legs 32 may alternatively or additionally be attached directly to the circumferential wall 18 of the tank body, for example by welding.

A drain conduit 34 features a drain pipe 36 that opens into the interior space of the tank body 12 through an opening 38 in the circumferential wall 18 (and lower reinforcement band 30, if present) at the topside of the bottom wall 16, and a drain control valve 40 operably installed on the drain pipe 36 to allow opening and closing thereof to control drainage of the liquid content from the tank body through the drain conduit. As shown, a drip tube 42 may be connected in series with the control valve 40 at a position downstream thereof at the free terminal end thereof that is located distally of the tank body 12, whereby the drip tube 42 defines the final exit point of the drain conduit 34 from which the liquid content is discharged when the control valve 40 is opened.

Where the proving vessel 10 of the present invention differs most notably from conventional designs is in the shape of the tank body 12, particularly at the bottom and circumferential walls 16, 18 thereof, and in the placement and orientation of the drain conduit 34 on the uniquely shaped tank body 12.

The circumferential wall 18 deviates from the purely cylindrical form of a conventional open neck prover design, instead having the shape of a cylinder that has been truncated at its lower end by an imaginary horizontal cylinder whose diameter equals or exceeds that of the circumferential wall 18, and whose longitudinal axis lies perpendicular to the central vertical axis 17 and perpendicular to a diametral plane 44 of the tank body that contains the central vertical axis 17 and a central longitudinal axis of the drain conduit 46. In the illustrated embodiment, the drain opening 38 in the circumferential wall 18 intersects the bottom edge thereof when initially cut prior to assembly of the circumferential and bottoms walls, and the bottom wall 16 of the tank body is affixed to the circumferential wall 18 around the full circumference thereof at this bottom edge, whereby the drain opening 38 opens into the interior space of the tank body in a position flush with the upper surface of the bottom wall at its lowest point of intersection with the circumferential wall.

In each and every vertical cross-sectional plane lying normal to the vertical diametral plane 44 containing the axis of the outlet conduit 34, the bottom wall 16 of the tank has an inverted saddle shape whose topside is concavely curved about an inclined axis residing in the same diametral plane 44. The bottom wall, like the other walls and the reinforcement bands, is preferably defined by a sheet metal, for example 12-gauge 304 stainless steel, whereby the thin sheet or plate like structure of the piece means that its underside is convexly shaped with a similar curvature to its topside, thereby defining the overall saddle-shape of the wall.

In each and every vertical cross-sectional plane lying normal to the vertical diametral plane 44 of the outlet conduit 34, the saddle-shaped contour of the concave topside of the bottom wall will has a lowermost point that resides in the same diametral plane 44 as the central axis 46 of the outlet conduit 34. From this lowermost point, the topside of the bottom wall 16 curves upwardly in both directions in a symmetric fashion about this diametral plane 44. The lowermost points in all these vertical cross-sectional planes collectively define a trough that spans across the interior space of the tank in the same diametral plane 44 as the axis 46 of the drain conduit 34. Linear drain trough axis 48 in the drawings represents an imaginary line intersecting all the lowermost points in the cross-sectional planes of the bottom wall, thereby defining the path of the trough. In FIG. 2, for illustrative convenience, the drain trough axis 48 and drain conduit axis 46 are drawn as one, although in actuality, the drain conduit axis 46 is spaced slightly above the drain path trough axis 48 that resides at the topside surface of the bottom all 16. In the illustrated embodiment, the bottom wall is non-curved, i.e. linear, in all vertical planes lying parallel to the diametral plane 44 containing the linear drain trough axis 48.

The bottom wall 16 is tilted about a horizontal axis lying perpendicular to the diametral plane 44 such that the bottom wall occupies a lower elevation at the drain opening 38 than at a point diametrically opposite the drain opening. The trough path 48 and the drain conduit axis 46 are parallel to one another, whereby the drain conduit 34 is tilted at the same angle as the bottom wall of the tank body so that liquid content of the tank body will drain smoothly through the drain conduit 34 on a continuous slope with the topside of the bottom wall. A prototype of the present invention featuring the upwardly-concave, saddle-shaped, obliquely-angled bottom wall and equally angled drain conduit 34 was found to provide vortex-free draining of the vessel that reduces the drain-time required to achieve an empty state of the vessel upon opening of the control valve 40 compared to conventional center-drain conical-bottom provers.

In summary of the illustrated embodiment, the prover 10 is a metal vessel with a narrow upper neck 20, and attached sight glass and scale plate, attached to the upper end of the tank body 12. The tank body 12 is comprised of a downwardly-expanding conical top wall 14 that is attached to a flat top end of a center section or circumferential wall 18. The bottom edge of the center section 18 is contoured to conform to the bottom wall 16. The bottom wall 16 has a single-troughed upwardly concave curvature, and is joined the circumferental wall 18 around its peripheral edge along a path defined by the intersection of an imaginary cylindrical tube of greater diameter than the circumferential wall of the prover with the cylindrical body of the prover with the longitudinal axis of the imaginary cylinder lying perpendicular to the axis 17 diametral plane 44 of the tank body at a position horizontally offset from the vertical upright axis 17 to the side thereof opposite the drain 34. The drain 34 exits the tank body at the lowest point thereon at the intersection of the bottom and circumferential walls at the same angle as the inclined bottom wall.

The slope and radius of the bottom section may vary. In one embodiment, the radius of the imaginary cylinder defining the intersection of between the circumferential wall and the bottom wall is 1.25 times greater than the radius of the circumferential wall of the body, and the bottom is sloped towards the drain at 15° from horizontal. In other embodiments, the radial ratio of the intersection-defining imaginary cylinder to the tank body may be greater or smaller, down to a minimum of one. Likewise, the slope of the bottom wall in the diametral plane 44 may be decreased, for example to as low as 10° in some embodiments, or even lower in others; or increased to values greater than 15°, and for example less than 45°, in other embodiments.

Figure 10:
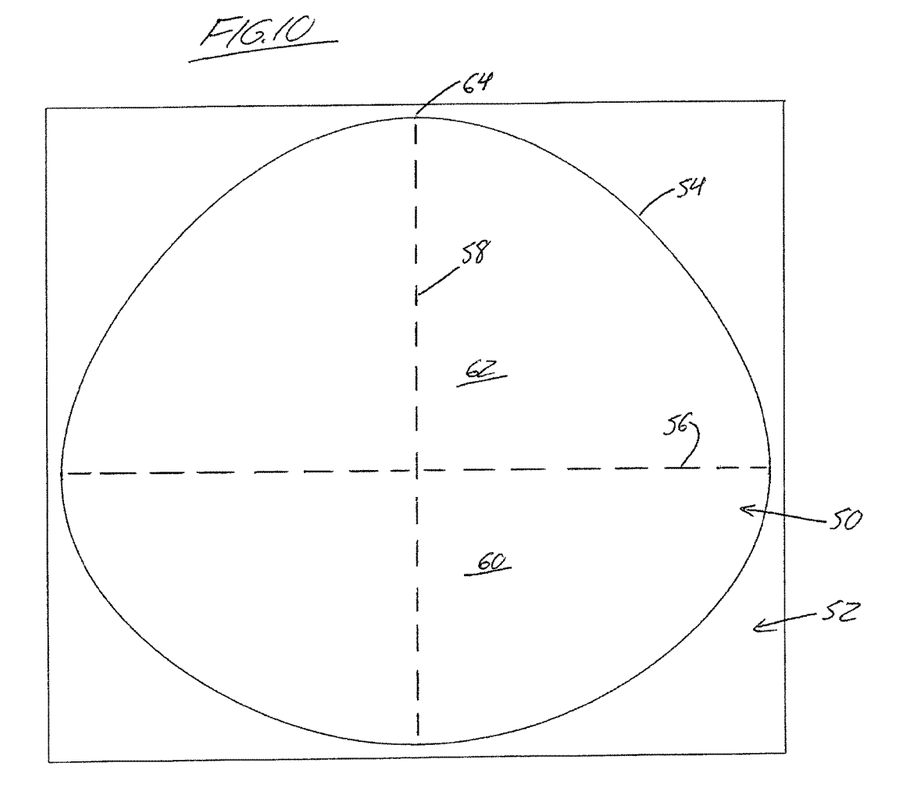
FIG. 10 is an overhead plan view illustrating a planar shape of the bottom tank wall as cut from a sheet metal plate prior to forming of the piece into its final 3D shape.

FIG. 10 illustrates an initial fabrication step of the bottom wall of the tank, in which a planar sheet metal piece 50 having a squashed-oval shape is cut out from a sheet metal plate 52, for example by a CNC laser cutting or other suitable cutting equipment. The figure shows a solid cut line 54 that defines the perimeter of the sheet metal piece 50 once separated from the surrounding remnants of the sheet metal plate 52. Broken lines are used to show major and minor axes 56, 58 of the squashed-oval piece 50 that lie perpendicular to one another and each intersect the perimeter cut line 54 of the piece in the flat plane thereof. The major axis 56 is longer than the minor axis 58, and the squashed-oval piece is symmetric about the minor axis 58.

A first half 60 of the squashed-oval piece 50 on one side of the major axis 56 generally resembles half of an ellipse, or an oval that is symmetric about both its axes, whose major axis coincides with the major axis 56 of the overall squashed oval piece 50. A second half 62 of the squashed-oval piece 50 on the other side of the major axis 56 generally resembles a portion of an oval that has only one axis of symmetry, and whose minor axis is coincident with the major axis 56 of the overall squashed oval piece 50. The overall piece 50 thus resembles an egg-shaped oval, i.e. an oval that is symmetric about only its major axis, that has been squished or compressed along its major axis, to the point that the major axis of the egg-shaped oval is now shorter than its other axis, and therefore now defines the minor axis 58 of the resulting squashed-oval shape.

Once the squashed oval piece 50 is cut, it is then formed into the final shape of the bottom tank wall by curving the cut piece 50 about an axis parallel to the minor axis 58 thereof to create the final non-planar shape of the bottom wall, whose trough axis 48 coincides with the minor axis 58 of the cut piece 50. The narrower end 64 of the cut piece 50 on the minor axis 58 thereof defines the outlet end of the tank's bottom wall at which the outlet conduit 34 opens into the tank interior. The radius of curvature of the finished bottom wall equals the radius of the imaginary cylinder that intersects the circumferential wall at the bottom edge thereof to define the path of intersection between the bottom and circumferential walls.

Figure 11:
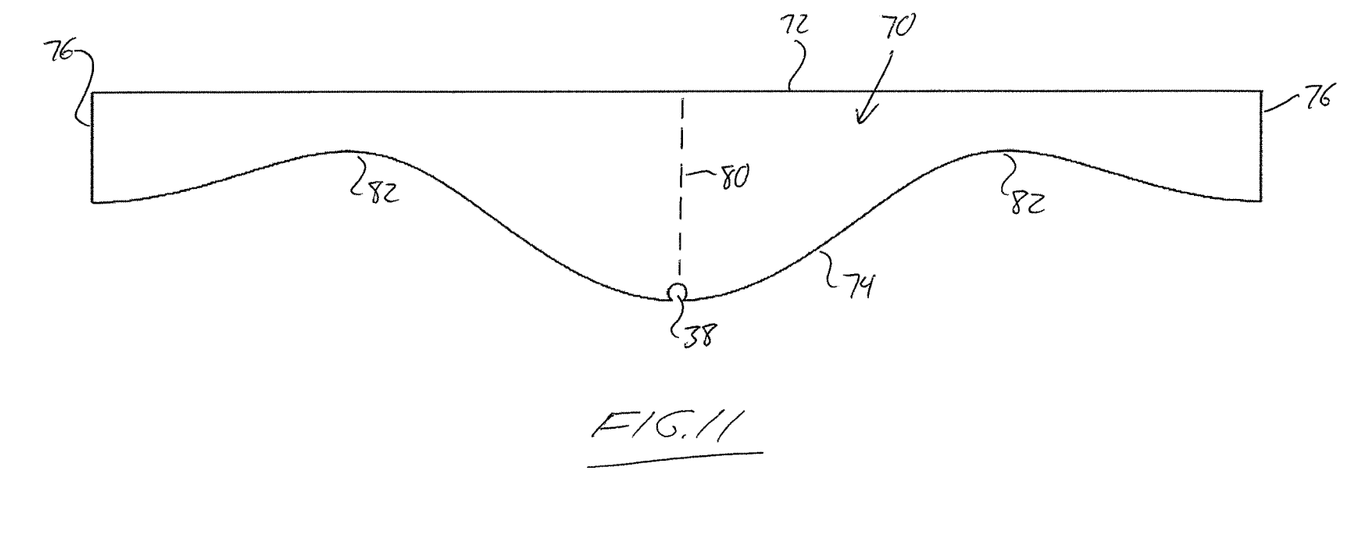
FIG. 11 is an overhead plan view illustrating a planar shape of the circumferential tank wall as cut from a sheet metal plate prior to forming of the piece into its final 3D shape.

FIG. 11 shows another planar sheet metal piece 70 cut out from a sheet metal plate, for example by a CNC laser cutting or other suitable cutting equipment, for subsequent forming of this piece 70 into the finished circumferential tank wall 18. The perimeter shape of the circumferential wall piece 70 features an elongated upper edge 72 of linear shape, an elongated lower edge 74 of curved wave-like shape, and a pair of parallel end edges 76 of linear shape perpendicularly connecting the upper and lower edges 72, 74 at the ends thereof. The drain opening 38 intersects the wave-like contour of the lower edge 74 at its lowermost point, i.e. where the lower edge 74 is at its greatest perpendicular distance from the linear upper edge 72, as denoted by a central axis 80 of the piece 70 in FIG. 11, about which the illustrated piece 70 is symmetric in the elongated dimension denoted by the linear upper edge 72.

Considering this lowermost point to be a trough of the wave-like shape, the lower edge 74 curves symmetrically upward from the trough on both sides thereof to respective peaks 82 of the wave-like shape. From each peak 82, the lower edge then curves downward to meet with the respective end edges 76. The wave-like shape is asymmetric about each peak 82, from which it extends outward toward the respective end 76 at a lesser angle of slope than its connection to the central trough at axis 80, as each end edge 76 is of shorter than the perpendicular distance between the upper edge 72 and the trough of the lower edge 74 at the lowermost point of the deepest central trough at central axis 80. This deepest trough of the wave-like shape is also referred to herein as the major trough of the wave shaped lower edge of the circumferential wall piece.

Figure 4:
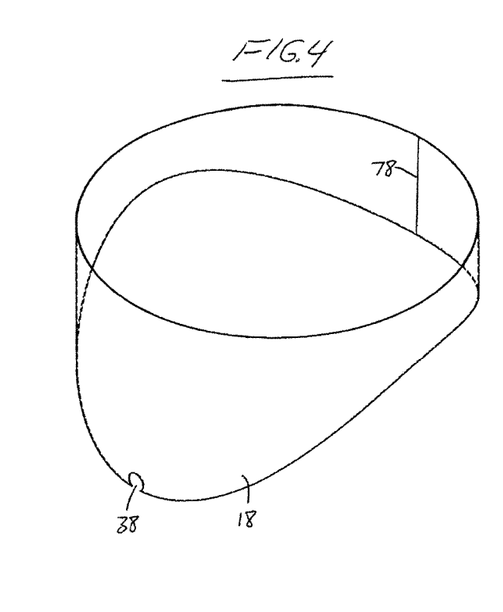
FIG. 4 is a perspective view of a circumferential tank wall of the proving vessel of FIG. 1 in isolation.
Figure 5:
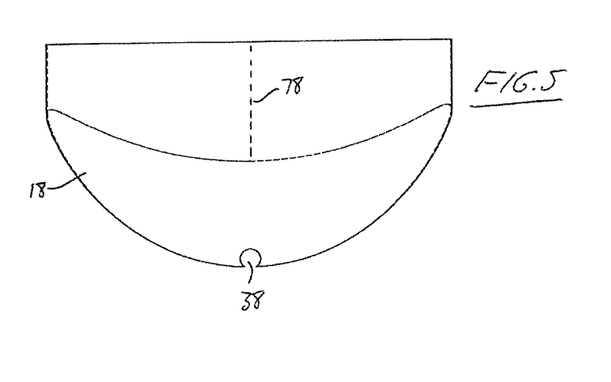
FIG. 5 is a front elevational view of the circumferential tank wall of FIG. 4.
Figure 6:
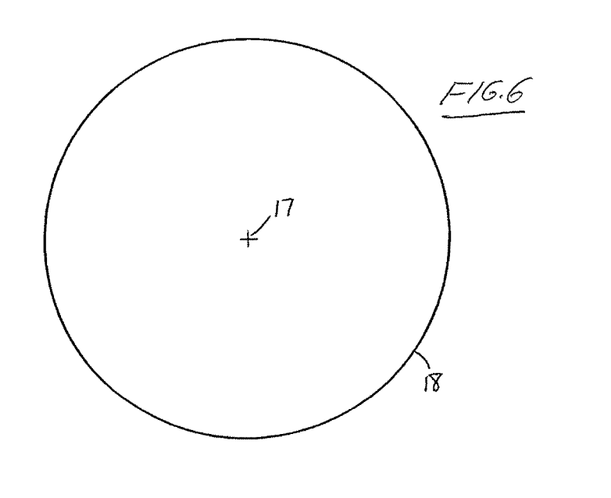
FIG. 6 is an overhead plan view of the circumferential tank wall of FIG. 4.
Figure 7:
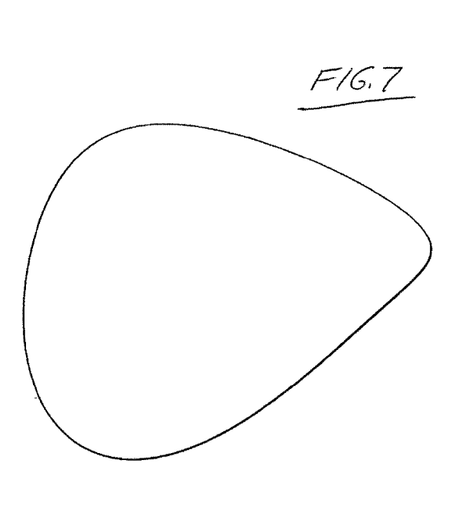
FIG. 7 is an isometric view of the bottom tank wall of the proving vessel of FIG. 1 in isolation.
Figure 8:
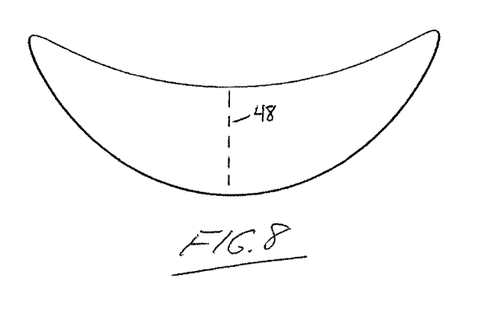
FIG. 8 is a front elevational view of the bottom tank wall of FIG. 7.
Figure 9:
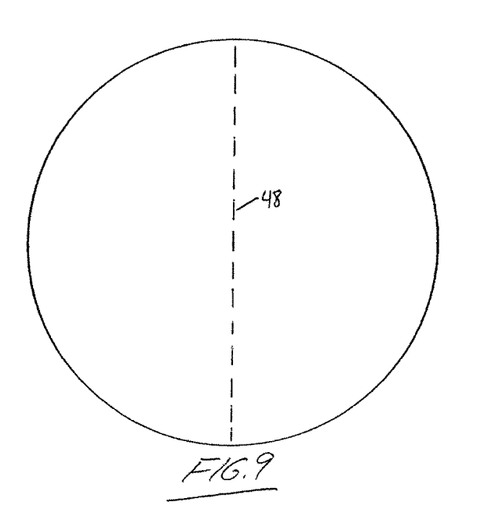
FIG. 9 is an overhead plan view of the bottom tank wall of FIG. 7.
Figure 12:
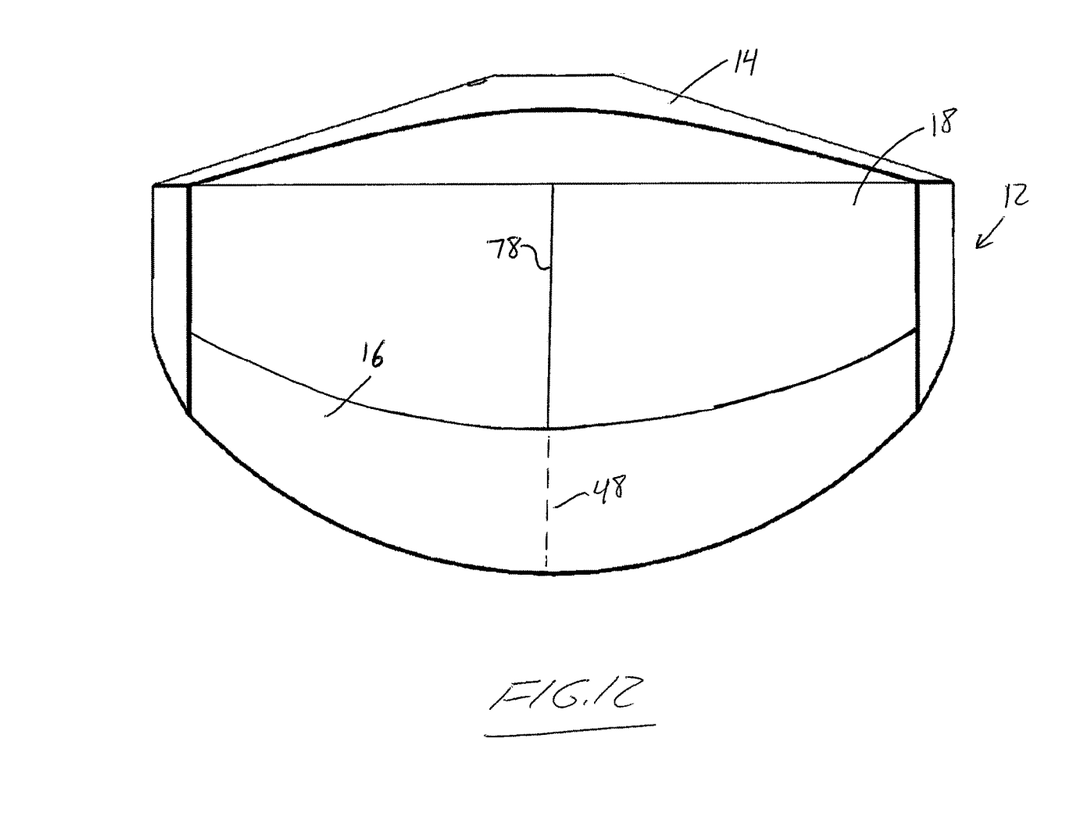
FIG. 12 is a cross-sectional view of the tank body, as cut in the vertical plane marked by line A-A of FIG. 3.

To form the circumferential tank wall 18, the circumferential wall piece 70 is bent into a circular form bringing the two ends 76 into abutment with one another around the central vertical axis 17 of the resulting tank interior. The abutted ends are then welded together, as illustrated by seam 78 in FIGS. 4 and 12. When the ends 76 are joined together, they collectively form a minor trough of the lower edge's wave-like shape that is shallower than the major trough at axis 80. The wave-like contour of the curved lower edge 74 of the circumferential wall piece 70 places this lower edge of the resulting circumferential wall 18 at the imaginary cylinder interesting the completed tank body. The major trough of the circumferential piece's lower edge at axis 80 aligns with the trough of the bottom wall of the tank body when the circumferential and bottom walls are fixed together, thereby placing the outlet opening 38 of the circumferential piece 70 at the appropriate location.

While the illustrated embodiment of the circumferential wall cut pattern in FIG. 11 has an entirely symmetric configuration in which the axis 80 at the major trough is centered in the elongated direction of the piece 70, the circumferential wall piece 70 may alternatively be cut in an asymmetrical pattern, where the axis 80 of the major trough is off-center in the elongated direction. In such instances, the result would effectively be a truncation of one end of the illustrated piece 70, and extension of the other end of the illustrated piece by the same area truncated from the first end. In the illustrated embodiment, the symmetry of the circumferential wall piece relative to the location of the drain opening 38 means that the welded seam 78 resides a the minor trough of the waive-like shape of the circumferential walls lower edge at a position diametrically opposite to the drain in the finished tank body In other embodiments, an asymmetric pattern for the circumferential wall may be used so as to position the welded seam 78 at a position angularly that is offset from the diametral plane 44 at which the drain resides, and hidden behind a respective one of the support legs 32. As as shown in the illustrated embodiment, the supports legs are preferably disposed at equally spaced intervals around the upright axis 18 of the tank body at positions placing two diametrically opposing legs at positions near, but spaced from, the diametral plane so as not to interfere with the drain conduit, while providing suitable support for the tank's area of greatest depth at the drain outlet.

The completed prover 10 may optionally include additional items such as levels useful for achieving a level position of the tank body with its upright axis 17 lying truly vertical, the illustrated top funnel and lid, a drop tube, thermal wells, the illustrated reinforcing bands, drip tubes or protective guards. The drain 34 may include facilities for a bottom fill inlet.

The volumetric prover can be calibrated to contain or deliver a precisely known volume of liquid. As such it can be used to determine the accuracy of liquid meters, or to calibrate other provers. Its uniquely shaped body does not have the propensity or tendency to form vortices, thereby greatly increasing the efficiency in evacuating the contents to achieve a faster pump-off or drain time of the vessel. The natural sloped curve of the bottom section focuses the flow of liquid during the evacuation, into a single path exiting via the drain, which supports a uniform and repeatable draining procedure to ensure the prover is always drained to the same state of emptiness, for example through a drip sequence monitored through the drip tube 42. The drain valve and drip tube are on the outer edge of the prover making the access and operation easy compared to the conventional center-drain conically bottomed prover bodies. The drip tube attached to the drain valve resides in a location with superior visibility compared to the conventional center-drain prover configuration. Due to the nature of the design, the overall height of the prover is reduced making operation easier and safer. That is, an obliquely sloped drain projecting outwardly from the outer circumference of the tank body occupies a lesser height than a vertically-oriented center drain at the lower tip of a conically-bottomed prover body of the same diameter and capacity.

Through the forgoing embodiments, the present application provides a volumetric proving vessel or device that includes a uniquely shaped bottom section that provides for more efficient evacuation of the contents when drained, as due to the shape of the vessel, the evacuating liquid does not tend to form vortices. The volumetric proving vessel that incorporates the uniquely shaped bottom section facilitates a consistent drain sequence or procedure, as the waning evacuating liquids flow towards the bottom of the curved bottom and then along the bottom towards the drain outlet. Another unique feature of the volumetric proving vessel is the convenient location of the drain outlet, optional bottom fill inlet and drip tube at the lowest, outermost edge of the prover body, where they are easier to access and view. The volumetric proving vessel that includes the uniquely shaped bottom section and outermost, lowermost placement of the drain outlet, optional bottom fill inlet and drip tube are located results in a lower overall height (than conventional cone bottomed provers of equal diameter and capacity), making the overall use easier and safer, for example by reducing the chance of fall or strain injury.

Although described herein as a prover for calibrating meters or other provers, the vessel may alternatively be employed for other purposes, such as metering out a precise volume of liquid in a manufacturing, processing or packaging plant or other point of liquid distribution.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A volumetric measurement vessel comprising:
    a tank body having comprising a set of tank walls delimiting an interior space of the tank body, said set of tank walls including a top wall, an opposing bottom wall and a circumferential wall spanning between the top and bottom walls and extending about an upright axis passing through said top and bottom walls;
    a neck standing upwardly from the tank body above the upper wall thereof along the upright axis, with an interior space of the neck in fluid communication with the interior space of the tank body;
    a gauge associated with the neck to indicate a volumetric measure of liquid content contained within the vessel; and an outlet positioned at an intersection of the bottom and circumferential walls of the tank body for draining of said liquid content from the vessel;

wherein a topside of the bottom wall of said tank body has a concave curvature defining a trough, the bottom wall is mounted in a tilted orientation placing the trough at an obliquely inclined angle relative to the upright axis, and the outlet is positioned at a lower end of the trough.

2. The volumetric vessel of claim 1 wherein the outlet comprises a drain conduit projecting from the tank body at the same oblique angle as the trough of the bottom wall.

3. The volumetric vessel of claim 2 comprising a drain valve operably installed on the drain conduit to control draining of the liquid content from the vessel through said drain conduit.

4. The volumetric vessel of claim 1 wherein the bottom wall is defined by a curved plate of inverted saddle shape having a convexly curved underside.

5. The volumetric vessel of claim 1 wherein the bottom wall and the circumferential wall are joined together along a path defined by the intersection of the circumferential wall with an imaginary cylinder that is greater in diameter than said circumferential wall and has a longitudinal axis perpendicular to, and offset from, the upright axis of the tank body.

6. A fabrication method for use in manufacturing the volumetric vessel of claim 1, the method comprising producing the bottom wall by:

cutting a flat metal piece into a squashed oval shape having major and minor axes lying perpendicularly across one another and intersecting a perimeter of the piece at areas of greatest width of the piece in directions of said axes; and bending the metal piece into a curved shape about an axis parallel to the minor axis of said flat metal piece to form the trough of the bottom wall of the tank body.

7. A fabrication method for use in manufacturing the volumetric vessel of claim 1, the method comprising producing the circumferential wall by:

cutting a flat metal piece into an elongated shape having an upper edge, an opposing lower edge, and end edges that are spaced apart in an elongated dimension of the piece and that intersect the upper and lower edges at ends thereof to complete a perimeter of the flat-metal piece, the lower edge having a wave-like shape having a major trough, a pair of crests and a minor trough; and forming the flat metal piece into a closed circular form around an axis in order to place the wave-like shape of the lower edge on the an imaginary peripheral surface of an imaginary cylinder of equal or greater form to said circular form; and fixing the metal piece in said circular form, whereupon said metal piece defines the circumferential wall of the tank body and the axis around which the metal piece closes defines the upright axis of the tank body, the major trough of the wave-like shape of the lower edge is alignable with the lower end of the trough of the bottom wall, and the minor trough of the wave-like shape of the lower edge resides diametrically opposite to the major trough across the upright axis.

\* \* \* \* \*